United States Patent [19]

Travis

[11] Patent Number: 5,730,338

[45] Date of Patent: Mar. 24, 1998

[54] TIRE MOUNTING BRACKET FOR THE ELIMINATION OF THE SPARE TIRE OBSTRUCTION

[75] Inventor: Kevin M. Travis, Waterford, Mich.

[73] Assignee: Chrysler Corporation, Auburn Hills, Mich.

[21] Appl. No.: 717,378

[22] Filed: Sep. 23, 1996

[51] Int. Cl.⁶ ........................................... B62D 43/06
[52] U.S. Cl. ................ 224/42.21; 224/401; 224/42.32
[58] Field of Search ................................ 224/403, 282, 224/42.21, 42.28, 42.4, 42.32, 401

[56] References Cited

U.S. PATENT DOCUMENTS

| | | |
|---|---|---|
| 2,052,970 | 9/1936 | Erbeck ........................ 224/42.21 X |
| 2,433,169 | 12/1947 | Stephenson et al. ......... 224/42.21 X |
| 2,488,481 | 11/1949 | Stephenson et al. . | 
| 2,995,283 | 8/1961 | Torkowski ................... 224/42.21 X |
| 3,283,973 | 11/1966 | Wargo . |
| 3,365,084 | 1/1968 | Fernicola ..................... 224/42.21 X |
| 3,448,904 | 6/1969 | Sahr ............................. 224/42.21 X |
| 3,753,520 | 8/1973 | Bobbe . |
| 4,116,373 | 9/1978 | Bryngelson .................. 224/403 X |
| 4,212,417 | 7/1980 | Scott . |
| 4,434,919 | 3/1984 | Flowers ....................... 224/42.21 |
| 4,484,699 | 11/1984 | Heck . |
| 4,485,945 | 12/1984 | Ankeny ....................... 224/42.21 X |
| 4,767,038 | 8/1988 | McVicar . |
| 4,834,273 | 5/1989 | Cimino . |
| 4,850,518 | 7/1989 | Salmon et al. . |

*Primary Examiner*—Renee S. Luebke
*Attorney, Agent, or Firm*—Roland A. Fuller, III

[57] ABSTRACT

A tire mounting bracket is provided for pivotally mounting a spare tire in a rear of a vehicle. The bracket is pivotal from a first position, for supporting the tire in a vertical position wherein the tire may obstruct a driver's view through the rear window, to a second position, for supporting the tire in a horizontal position above the vehicle floor so that the driver's view is not obstructed by the spare tire.

8 Claims, 2 Drawing Sheets

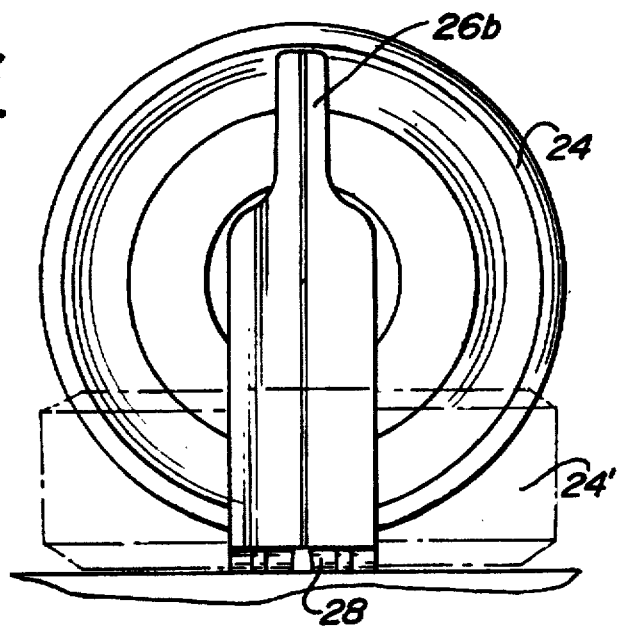
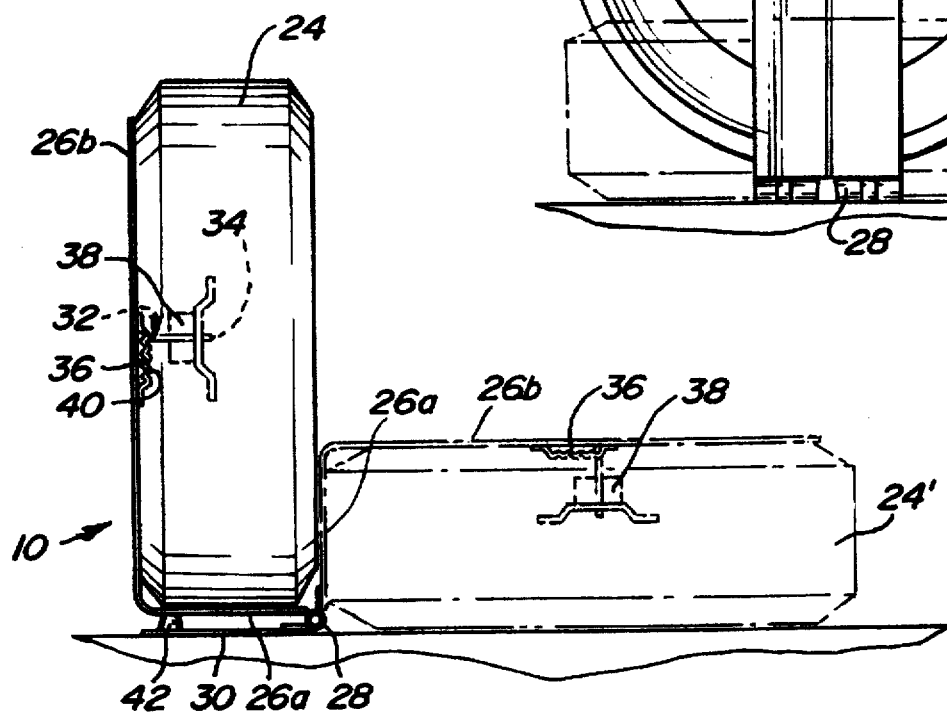
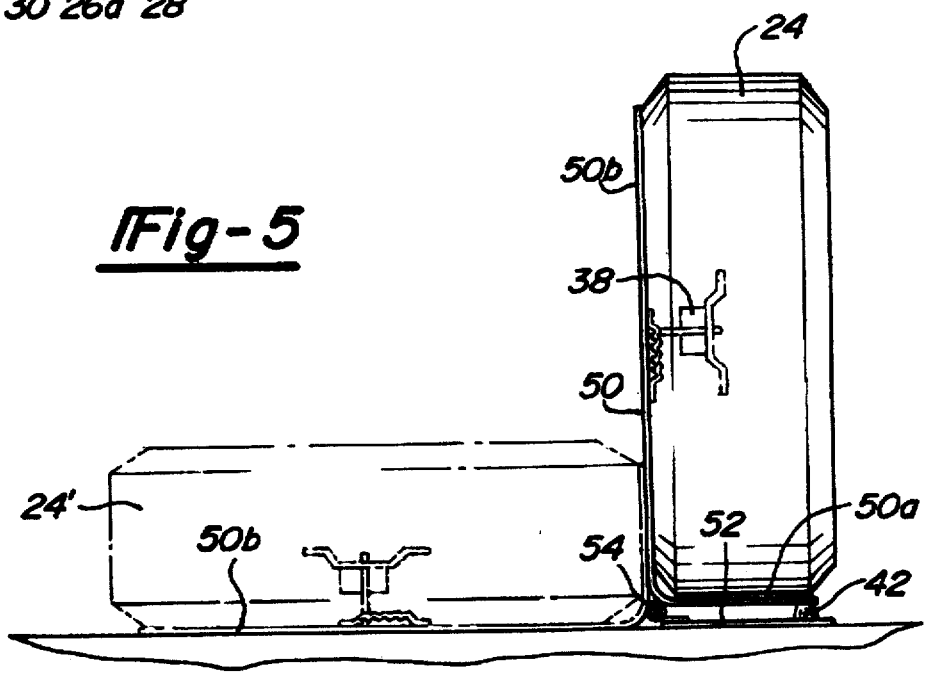

TIRE MOUNTING BRACKET FOR THE ELIMINATION OF THE SPARE TIRE OBSTRUCTION

BACKGROUND OF THE INVENTION

1. Field of the Invention

The present invention relates to a spare tire mounting bracket, and more particularly, to a spare tire mounting bracket for eliminating the rear window obstruction caused by the tire when mounted in the vertical position inside of the rear of the vehicle.

2. Background and Summary of the Invention

Nearly all vehicles which travel the roadways today are equipped with a spare tire. Many methods have been designed for storing the spare tire. In automobiles with a trunk, the spare tires are most often stored in the trunk.

In sport/utility-type vehicles and vans, the spare tire has been commonly stored under the vehicle, on the rear door or liftgate of the vehicle, or has been mounted inside of the vehicle either in a vertical position along one side wall of the rear of the vehicle, or in a horizontal position mounted to the floor of the vehicle. There are several disadvantages associated with each of the above-described methods for storing a spare tire on a vehicle. In particular, the method of mounting the tire underneath the vehicle requires that the vehicle underbody be designed specially to accommodate the spacial requirements of the tire. This means the gas tank, exhaust system, and rear axle must all be designed to provide sufficient space for under body storage of a spare tire. In addition, the spare tire is exposed to the outside environment including the dirt and stones that are sprayed under the vehicle. Furthermore, removal of a tire stored below the vehicle is also cumbersome.

The method of attaching the spare tire to the liftgate of the vehicle also suffers from the disadvantages that the spare tire partially blocks the rear window view of the driver. Also, a common problem with the brackets which are used to mount the tires to the liftgate is that they create undesirable noise. The tires stored on the liftgate of the vehicle are also exposed to the outside environment.

A tire which is stored in a vertical position along the side wall of the interior of the vehicle also suffers from the disadvantage that the tire partially obstructs the rear view of the driver. However, the interior mounting of the spare tire protects the spare tire from exposure to the dirt and grime that exteriorly-mounted tires are exposed to.

Tires which are mounted in a spare tire well of a floor in a rear of a vehicle also have the advantage that the tires are protected from the outside environment. However, this mounting technique decreases the amount of storage space in the rear of the vehicle due to increased normal floor height and decreases the ability to transport tall cargo.

Accordingly, it is desirable in the automotive industry to provide a spare tire mounting device that allows the spare tire to be stored in the interior of the vehicle and also eliminates rear visibility obstruction while also permitting the transport of tall cargo when desired.

Accordingly, the present invention provides a tire mounting bracket for use in a vehicle for pivotally mounting a tire for movement between a vertical position to a horizontal position, comprising a pivoting bracket hingedly attached to a floor of a vehicle. The pivoting bracket is movable from a first position, for supporting the tire in a vertical position, to a second position for supporting the tire in a horizontal position above the floor of the vehicle. A mounting member is provided for mounting the tire to the pivoting bracket. When the spare tire is stored in the upright position, the rear of the vehicle retains its original floor height and permits the transport of tall cargo. When the spare tire is in the lowered position, the rear visibility obstruction is eliminated. The spare tire can be covered with a spare tire cover and/or cargo shade which enhances the appearance of the spare tire in either position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a side view of the tire mounting bracket of the present invention showing :the tire in a vertical and horizontal position;

FIG. 4 is a rear view of the tire mounting bracket of the present invention illustrating the tire in the vertical and horizontal positions; and FIG. 5 illustrates a front view of a tire mounting bracket according to a second embodiment of the present invention.

DETAILED DESCRIPTION OF THE PREFERRED EMBODIMENTS

Figure 1:
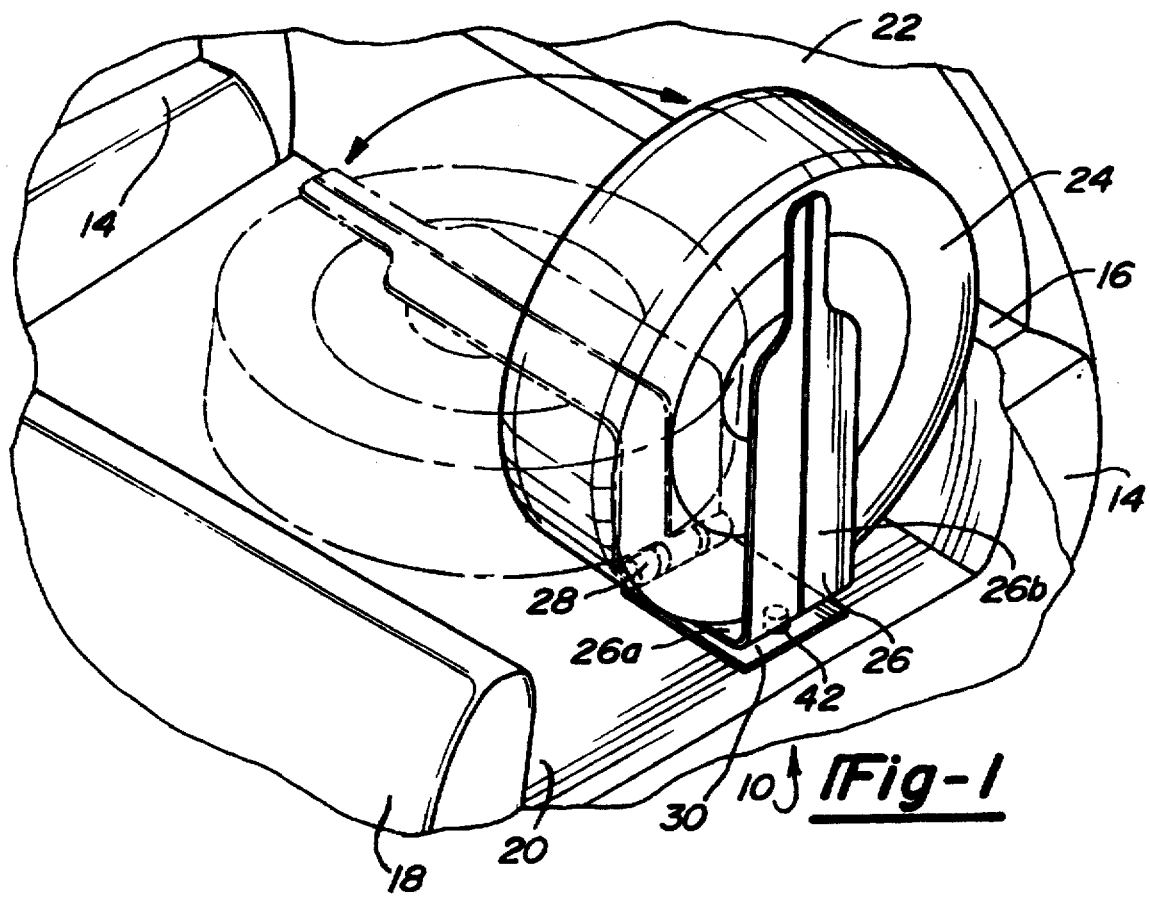
FIG. 1 is a perspective view of the tire mounting bracket according to the present invention shown within the rear of a sport/utility-type vehicle.

With reference to FIGS. 1–4, a first embodiment of the present invention will be described. In FIG. 1, a tire mounting bracket 10 is illustrated in its most likely use environment within the rear of a sport/utility or van-type vehicle 12. The vehicle 12 generally includes a pair of rear inner wheel houses 14, a liftgate 16, a rear seat 18, and a floor 20. Liftgate 16 is generally provided with a rear window 22.

Tire mounting bracket 10 is provided for mounting a spare tire 24 in either a vertical position or in a horizontal position as represented by reference numeral 24'. Tire mounting bracket 10 includes an L-shaped pivoting bracket portion 26 which is hingedly attached to the floor 20 of the vehicle by a hinge portion 28 which connects the pivoting bracket portion 26 with a base plate portion 30. L-shaped pivoting bracket 26 includes a first shortened platform portion 26a upon which tire 24 rests when in a vertical position. L-shaped pivoting bracket 26 also includes an elongated side mounting portion 26b which supports the side of tire 24.

With reference to FIG. 4, a mounting member 32 is shown including a tire bolt 34 mounted to an adjustable bolt bracket 36. A rim nut 38 is adapted to be received within the central hub portion of tire 24 and threadedly engages bolt 34 for securely mounting tire 24 to the tire mounting bracket 10. The adjustable bolt bracket 36 is provided with a plurality of rib portions 40, each of which are adapted to be engaged by bolt 34 so that tire mounting bracket 10 can accommodate different sized spare tires 24.

A bumper pad 42 is attached to base plate 30 and is provided for cushioning the platform portion 26a of L-shaped pivoting bracket 26 when it is in the vertical position.

Figure 2:
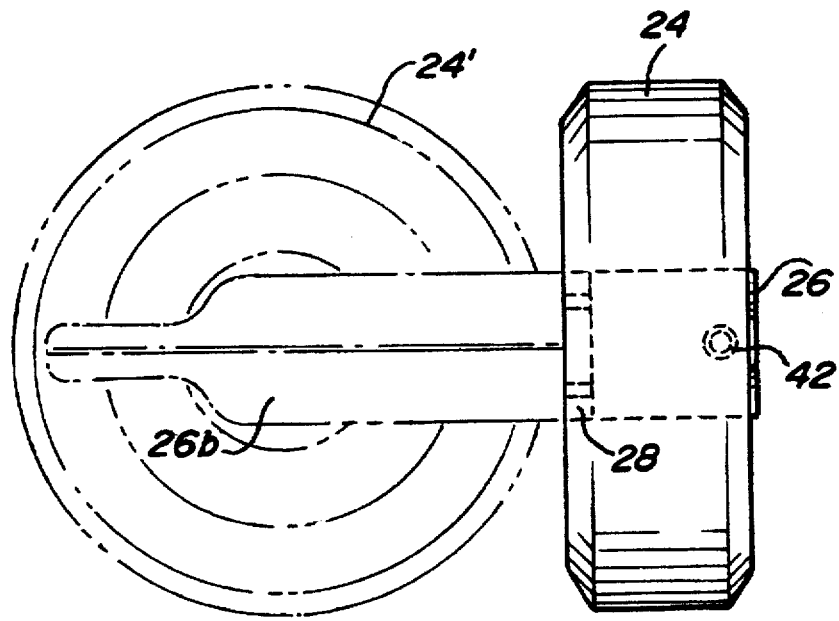
FIG. 2 is a top view of a spare tire mounted to the tire mounting bracket of the present invention with the tire shown in both the vertical and horizontal positions.

FIGS. 2 and 3 illustrate top and side views, respectively, depicting the tire mounting bracket having a spare tire mounted thereon in both a vertical and horizontal position.

With reference to FIG. 5, a second embodiment of the present invention is shown wherein an L-shaped pivoting bracket 50 is attached to a base plate 52 by a hinge 54. The embodiment shown in FIG. 5 illustrates the hinge 54 being located at the intersection between the platform portion 50a and the side supporting portion 50b of the L-shaped pivoting bracket 50. In comparison, the embodiment of FIGS. 1-4 include the hinge 28 disposed at the end of the platform portion 26a of the L-shaped pivoting bracket 26. One of the functional differences between these embodiments is that the first embodiment illustrated in FIGS. 1-4 requires that the tire nut 38 be removed from bolt 34 while the tire 24 is in the vertical position. Contrary to this, the embodiment of FIG. 5 requires that the tire be in the horizontal position in order to have access to tire nut 38 for removal of spare tire 24.

A latching mechanism can be provided for securing the L-shaped pivoting bracket 26 in the vertical position. In addition, standard spare tire covers can be used for covering the tire while mounted on bracket 10.

The present invention allows the spare tire to be packaged inside the vehicle while providing the opportunity to fold the spare tire flat for increased visibility. When storage space is needed in the rear of the vehicle, the spare tire can be folded into the vertical position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire mounting bracket for use in a vehicle for pivotally mounting a tire for movement between a vertical position to a horizontal position, both positions within the vehicle, comprising:

a pivoting bracket hingedly attached to a floor of a vehicle within the vehicle, said pivoting bracket being movable from a first position, for supporting said tire in a vertical position, to a second position inside the vehicle, for supporting said tire in a horizontal position above said floor of said vehicle; and a mounting member for mounting said tire to said pivoting bracket.

2. The tire mounting bracket according to claim 1, further comprising a base plate mounted to said floor of said vehicle, said pivoting bracket hingedly attached to said base plate.

3. The tire mounting bracket according to claim 2, further comprising a bumper pad attached to one of said base plate and said pivoting bracket.

4. The tire mounting bracket according to claim 1, wherein said mounting member is adaptable for accommodating tires of different sizes.

5. A vehicle having a mounting bracket for pivotally mounting a tire for movement between a vertical position to a horizontal position, both positions inside of the vehicle, comprising:

a pivoting bracket hingedly attached to a floor of said vehicle, said pivoting bracket being movable from a first position inside the vehicle, for supporting said tire in a vertical position, to a second position inside the vehicle, for supporting said tire in a horizontal position above said floor of said vehicle; and a mounting member attached to said pivoting bracket for mounting said tire to said pivoting bracket.

6. The vehicle according to claim 5, further comprising a base plate mounted to said floor of said vehicle, said pivoting bracket hingedly attached to said base plate.

7. The vehicle according to claim 6, further comprising a bumper pad attached to one of said base plate and said pivoting bracket.

8. The vehicle according to claim 5, wherein said mounting member is adaptable for accommodating tires of different sizes.

* * * * *